US008874848B2

(12) United States Patent
Soundararajan et al.

(10) Patent No.: US 8,874,848 B2
(45) Date of Patent: Oct. 28, 2014

(54) INTELLIGENCE FOR CONTROLLING VIRTUAL STORAGE APPLIANCE STORAGE ALLOCATION

(75) Inventors: Gokul Soundararajan, Sunnyvale, CA (US); Kaladhar Voruganti, Sunnyvale, CA (US); Lakshmi Narayanan Bairavasundaram, Sunnyvale, CA (US); Priya Sehgal, Karnataka (IN); Vipul Mathur, Karnataka (IN)

(73) Assignee: Net App, Inc., Sunnyvale, CA (US)

( * ) Notice: Subject to any disclaimer, the term of this patent is extended or adjusted under 35 U.S.C. 154(b) by 508 days.

(21) Appl. No.: 13/250,911

(22) Filed: Sep. 30, 2011

(65) Prior Publication Data
US 2013/0086324 A1    Apr. 4, 2013

(51) Int. Cl.
*G06F 12/00* (2006.01)
*G06F 12/08* (2006.01)
*G06F 13/00* (2006.01)
*G06F 13/28* (2006.01)

(52) U.S. Cl.
CPC ............................. *G06F 12/0888* (2013.01); *G06F 12/0813* (2013.01)
USPC ............................ 711/122; 711/171; 711/173

(58) Field of Classification Search
CPC .................. G06F 2212/2515; G06F 2212/601
USPC .......................................... 711/122, 171, 173
See application file for complete search history.

(56) References Cited

U.S. PATENT DOCUMENTS

| 2005/0240558 | A1* | 10/2005 | Gil et al. ........................... 707/1 |
| 2006/0004957 | A1* | 1/2006 | Hand et al. ..................... 711/113 |
| 2006/0112219 | A1* | 5/2006 | Chawla et al. ................. 711/114 |
| 2007/0050548 | A1 | 3/2007 | Bali et al. |
| 2011/0153770 | A1* | 6/2011 | Antani et al. .................. 709/208 |

OTHER PUBLICATIONS

International Search Report and Written Opinion from PCT/US2012/034475 mailed Aug. 6, 2012, 11 pages.

* cited by examiner

*Primary Examiner* — Yaima Rigol
*Assistant Examiner* — Mark Giardino, Jr.
(74) *Attorney, Agent, or Firm* — DeLizio Gilliam, PLLC

(57) ABSTRACT

A change in workload characteristics detected at one tier of a multi-tiered cache is communicated to another tier of the multi-tiered cache. Multiple caching elements exist at different tiers, and at least one tier includes a cache element that is dynamically resizable. The communicated change in workload characteristics causes the receiving tier to adjust at least one aspect of cache performance in the multi-tiered cache. In one aspect, at least one dynamically resizable element in the multi-tiered cache is resized responsive to the change in workload characteristics.

22 Claims, 8 Drawing Sheets

INTELLIGENCE FOR CONTROLLING VIRTUAL STORAGE APPLIANCE STORAGE ALLOCATION

FIELD

Embodiments described are related generally to management of networked storage, and embodiments described are more particularly related to managing a multi-tiered caching system in a virtualized environment.

COPYRIGHT NOTICE/PERMISSION

Portions of the disclosure of this patent document can contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2011, NetApp, Inc., All Rights Reserved.

BACKGROUND

Data for companies or other organizations is commonly stored in networked storage. The networked storage center can be referred as a data center. The resources of a data center such as storage and access bandwidth are limited. Thus, a common goal for a data center is to improve utilization of the resources of the storage center, to improve storage utilization and access throughput. There may be applications within the company or organization that generate large workloads, making many access requests to the data center. Data access to storage is typically slow relative to computer processing speeds. One way to improve resource use in a data center is to provide caching, recognizing that data accessed in a workload has a greater likelihood of being accessed again relative to other data stored in the data center.

A caching system may be multi-tiered, where there are multiple layers of caching, which are coordinated. Traditionally, lower layers of cache, or the layers closer to the processing resources, have smaller size but are faster relative to the higher layers of cache. Thus, traditional cache levels decrease in size and increase in speed the closer the cache level gets to the processing resources. From the other perspective, the closer the cache level is to the client making the access request, the larger and slower it traditionally is.

Cache coherency protocols, or coordination communication among the levels of cache have an underlying assumption based on the speed and size of the cache levels. Traditional multi-tier cache protocols or traditional inclusion, exclusion approaches to cache coherency have underlying assumptions regarding cache size and speed. Deviations in cache structure would render such traditional protocols unsuitable for use with the different cache structure.

Returning to the concept of data center resource utilization, the structuring of cache systems fixes the use of resources in the system. To the extent the data access of a data center is highly dynamic, the traditional fixed structure of caches can hinder performance as often as it improves performance. The traditional fixed structure results in redundancy of data and redundancy of caching effort among cache layers. The redundancy of data consumes resources that could otherwise be preserved for other use.

In a traditional cache, the different caching levels or tiers of the cache are oblivious of the caching decisions and workload changes experienced at each of these different tiers. The different tiers of the cache are traditionally not able to obtain first-hand information about the changes at other tiers. The lack of first-hand information leads to a communication gap among the cache levels. The communication gap in turn causes each caching tier to take extra effort to speculate about the workload changes and later adapt to them. Such duplicated effort increases the adaptation time of the overall system, which decreases or nullifies the caching effort.

SUMMARY

A change in workload characteristics detected at one tier of a multi-tiered cache is communicated to another tier of the multi-tiered cache. Multiple caching elements exist at different tiers, and at least one tier includes a cache element that is dynamically resizable and can be dynamically instantiated or destroyed. The communicated change in workload characteristics causes the receiving tier to adjust at least one aspect of cache performance in the multi-tiered cache. At least one dynamically resizable element in the multi-tiered cache can be resized responsive to the change in workload characteristics.

BRIEF DESCRIPTION OF THE DRAWINGS

The following description includes discussion of figures having illustrations given by way of example of implementations of embodiments described. The drawings should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

Descriptions of certain details and embodiments follow, including a description of the figures, which can depict some or all of the embodiments described below, as well as discussing other potential embodiments or implementations of the inventive concepts presented herein.

DETAILED DESCRIPTION

As described herein, a multi-tiered cache system detects changes in workload at each tier of the cache, and each tier automatically responds to workload changes with dynamic changes in caching behavior. When one tier of the multi-tiered cache system detects a change in workload characteristics, it communicates the change to another tier of the multi-tiered cache system. The communicated change in workload characteristics causes the cache tier receiving the communication to adjust at least one aspect of cache performance or behavior in the multi-tiered cache. In one aspect, the receiving tier resizes at least one dynamically resizable element in response to the change in workload characteristics. In certain embodiments, the multi-tiered cache system changes read-ahead behavior, or bypasses caching altogether in response to changes in workload characteristics, In other embodiments, the multi-tiered cache system can dynamically instantiate a cache (such as a virtual storage appliance or VSA) close to the client, where the VSA can absorb most of the read traffic for the client The cache system can also decommission the VSA if the characteristics of the workload are no longer VSA cache friendly.

Figure 1:
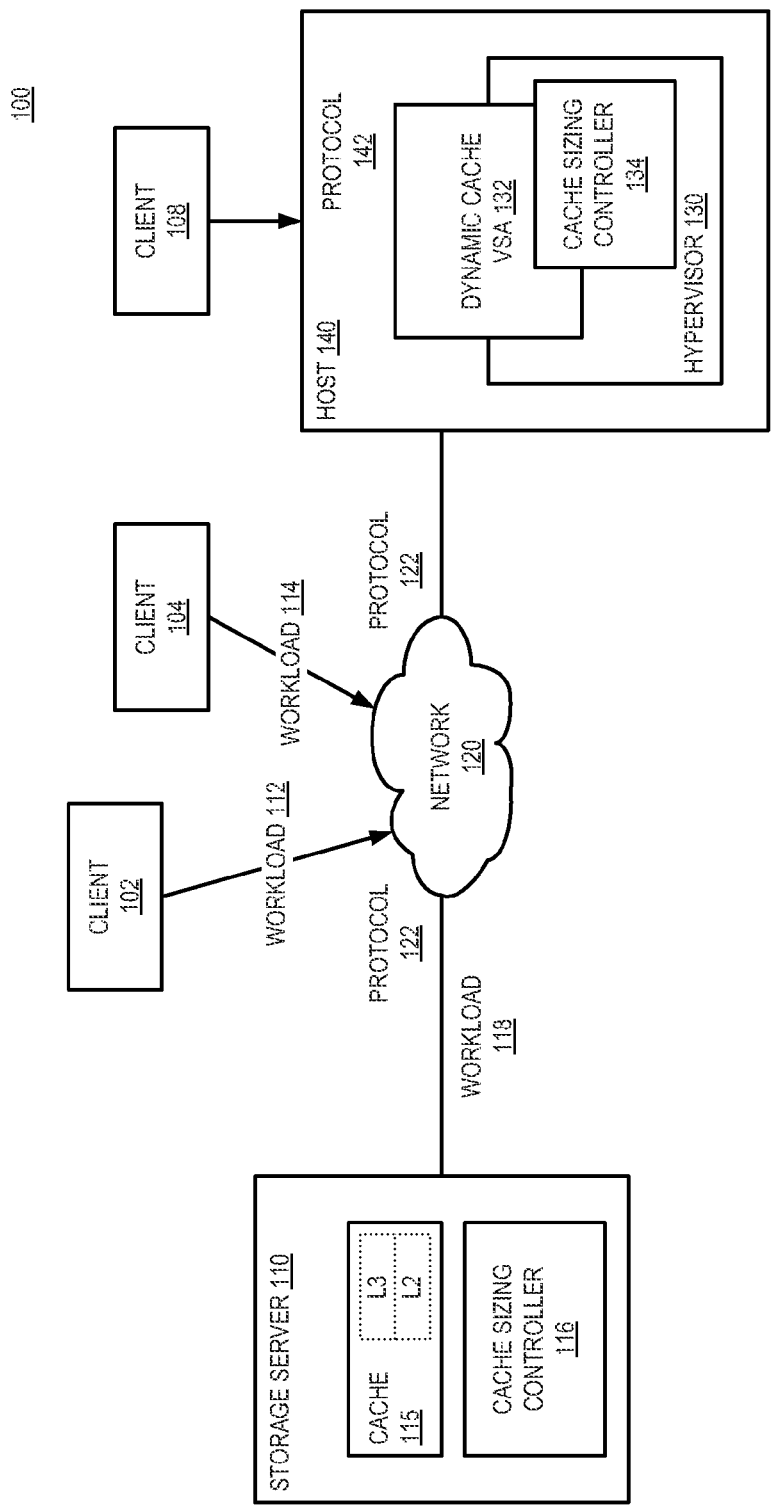
FIG. 1 is a block diagram of an embodiment of a storage server system with a virtual storage appliance as a tier of cache that can be dynamically re-sized.

FIG. 1 is a block diagram of an embodiment of a storage server system with a virtual storage appliance as a tier of cache. System 100 is a storage server system that provides data access from storage attached (not shown) to storage server 110 to a client 108 that connects via host 140. The client makes data access requests via an application executing on host 140. The data access requests can also be referred to as I/O (input/output) requests, and can be to read and/or write data to the storage managed and served by storage server 110.

System 100 illustrates a multi-tiered cache configuration with a dynamic cache VSA. Namely, storage server 110 includes cache 115, which is a lowest tier or level of cache in the cache hierarchy. As used herein, "tier" refers to the separation of the control logic within the multi-tiered cache system. Each tier includes a caching device, which includes storage or memory and a feedback/sizing controller or logic 116 to determine how caching is to be performed at the specific tier. The controller determines what data is to be stored in the cache. It will be understood that alternative terms such as "level" or "layer" could also be used to refer to the separate tiers.

The storage server connects to dynamic cache VSA 132 via network 120. Network 120 can be any type or combination of wide area networks. Dynamic cache VSA 132 is instantiated on hypervisor 130 that is physically close or on host 140. Host 140 hosts hypervisor 130. Physically close refers generally to the idea that a local area network or a local connection is used to connect the devices, rather than connecting over a wide area network. As used herein, instantiation refers to creating an instance or a copy of a source object or source code. The source code can be a class, model, or template, and the instance is a copy that includes at least some overlap of a set of attributes, which can have different configuration or settings than the source. Additionally, modification of an instance can occur independent of modification of the source.

Dynamic cache VSA 132 is typically populated as host 140 reads data from the source storage server 110. On the first read of any data, the cache fetches data from storage server 110, stores it in dynamic cache VSA 132 and forwards it to host 140. As the reads pass through dynamic cache VSA 132, the cache fills up. Any subsequent access of the data that is stored in dynamic cache VSA 132 can be immediately served from the dynamic cache, which reduces the roundtrip time or the latency. In one embodiment, dynamic cache VSA 132 acts like a write-through cache, where all writes from host 140 are passed directly to storage server 110. Only when storage server 110 responds to a write request, dynamic cache VSA 132 acknowledges the result to host 140 or other cache tiers—e.g., RAM (buffer cache) and SSD or flash.

Similarly to dynamic cache VSA 132, cache device 115 within storage server 110 caches data to serve to dynamic cache VSA 132, avoiding access to storage resources for data that is cached within storage server 110. In one embodiment, cache device 115 is actually separated into two separate cache devices.

Storage server 110 further includes controller 116, which represents the control logic of storage server 110 related to determining when a workload characteristic change occurs, or when the working set size has changed, whether there is overlap between working sets of two workloads, and when to propagate these changes to the sizing controller 134 of dynamic cache VSA 132. Working set refers to a set of data being cached due to an application accessing the data. Controller 116 could be considered a cache device at a tier in a multi-tiered cache. Additionally, controller 116 can determine what operations to perform in response to an indication from dynamic cache VSA 132. Controller 116 can be implemented as part of other control logic of the storage server, or it can be implemented as separate control logic (whether virtually (e.g., code), or physically (e.g., hardware separate).

The communication could be considered to occur between storage server 110 and dynamic cache VSA 132, or it could be considered to occur between controller 116 of storage server 110 and controller 134 of dynamic cache VSA 132. Controller 134 is similar to controller 116, in that it performs the same functions at dynamic cache VSA 132 that controller 116 performs at storage server 110. Thus, similarly, controller 134 could be considered a device of a multi-tiered caching system, In one embodiment, controller 134 is implemented outside the virtual machine (VM) that contains dynamic cache VSA 132. For example, controller 134 could be a separate virtual entity of hypervisor 130. The controllers provide the intelligence of when to communicate to other cache tiers, what to communicate, and control how the receiving tier responds to an indication from another tier in terms of sizing its own cache in the tier. It will be understood that a virtual machine refers to a software environment instance (or virtual environment) that executes on hardware resources shared with other virtual environments. The allocation of hardware resources to virtual environments is typically performed by a virtual machine manager or hypervisor, which maps resource requests from the virtual environments to physical hardware resources.

In one embodiment, each cache tier includes, such as in its controller, a monitoring infrastructure that collects statistics at the cache tier. For example, a monitor (such as a monitoring daemon) can collect statistics related to workload characteristics (e.g., read-write ratio, random-sequential ratio, I/O size), cache statistics (e.g., hit ratio, utilization), and/or performance or SLO (service level objectives) statistics (e.g., latency, throughput). The monitored statistics are fed into the controller (i.e., 116 or 134) to allow the controller to determine whether the workload or working set is changing. In one embodiment, the controller can be considered to include the processing resources, inter-tier communication resources, and monitoring resources by which determinations are made and communications passed between cache tiers.

Each controller (e.g., 116 or 134) receives the statistics and communication from other cache tiers, determines the size of the cache at its tier or level, and the impact of its caching on other cache tiers. In one embodiment, all determinations of impact are performed at a workload granularity. Thus, the controller can use workload statistics to determine the changes experienced by its caching tier. The controller can determine from detected changes that another cache tier should be notified.

In one embodiment, the controllers try to determine one or more of the following. The controller can determine whether a particular workload has changed, such as if a read-write ratio has increased. If the controller detects a workload change, it will try to increase the size of the cache at the local tier and decrease the partition size on other cache tiers for the same workload. The controller can determine whether the working set size has changed or the working set has changed. The controller can determine whether there is enough free cache space available or determine other resource availability. The controller can determine whether the overlap between working sets of two workloads has increased or decreased. The controller can determine whether workloads have been added or removed.

System 100 also illustrates different ways that storage server 110 can experience multiple workloads. Workload 112 and workload 114 come to storage server 110 through a channel other than dynamic cache VSA 132. More particularly, clients 102 and 104 access storage server 110 over a different network than network 120 or via a different host than host 140. Clients 102 and 104 can be considered to access storage server 110 directly and not via a dynamic cache VSA, whereas the access of client 108 is through dynamic cache VSA 132. Workload 118 comes to storage server 110 via dynamic cache VSA 132, from client 108.

The workloads are separate or distinct from each other because the have different sources, or they originate from different applications or different clients. Thus, each workload associated with requests from a different application can be referred to as a distinct workload. The different workloads 112, 114, and 118 could access either the same or different storage object such as a volume on the storage server. Depending on whether the different workloads are accessing the same or different volumes, the storage server experiences a certain resultant workload characteristic at its end, which is used by the storage server to make certain caching decisions as explained below.

There are many different possible protocols that could be used by the devices of system 100 to communicate. In one embodiment, the client can issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client can issue packets including block-based access protocols, such as the Small Computer Systems Interface (SCSI) protocol encapsulated over TCP (iSCSI) and SCSI encapsulated over Fibre Channel (FCP), when accessing information in the form of blocks. Protocol 142 represents the protocol used by a client to make data access requests such as NFS/CIFS or others. Dynamic cache VSA 132 communicates via protocol 142 to the clients (such as client 108) of host 140.

In one embodiment, dynamic cache VSA 132 communicates with the origin storage server 110 using a different protocol than protocol 142. The protocol used for communication with storage server 110 is shown as protocol 122. There can be embodiments where protocol 122 is the same as protocol 142. However, they can be different. In one embodiment, protocol 122 is the NRV (NetApp Remote Volume) protocol. Protocol 122 can be augmented to include cache-communication requests (for example, augmented NFS or CIFS could be used similar to what is described herein). Examples of augmentations to the protocol are described in more detail below.

In one embodiment, workloads 112 and 114 share cache 115 (e.g., a buffer cache) on storage server 110 along with workload 118, which is purely a dynamic cache workload. Such sharing necessitates use of a partitioned cache within storage server 110, in which case the workloads that are offloaded to the VSA have a small partition space of the buffer cache as compared to other workloads accessing data without any VSA. In one embodiment, workload 118 uses cache 115 of storage server 110 to cache data until the transfer to an N-blade (as described in FIG. 6B) is complete or to cache pre-fetched data, based on read-ahead policies implemented at storage server 110.

Figure 2:
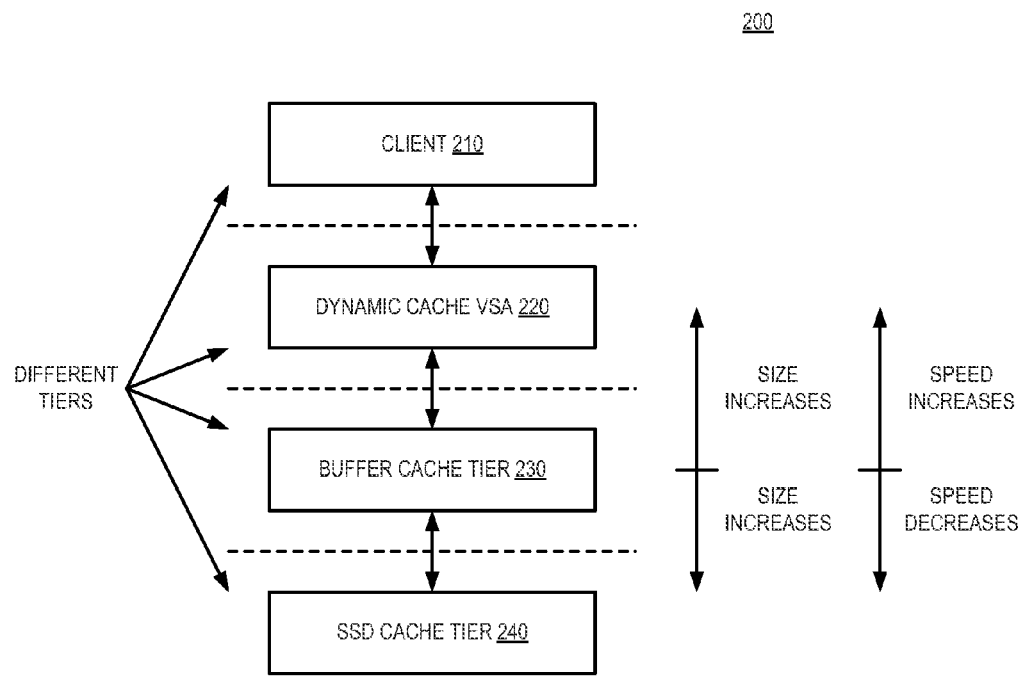
FIG. 2 is a block diagram of an embodiment of a multi-tiered cache with a virtual storage appliance.

FIG. 2 illustrates a hierarchical cache view of system 100 of FIG. 1. Processing environment 200 includes multiple levels of processing, shown as different tiers. There may be more tiers used than what is illustrated here. Processing environment 200 is a multi-tier cache system. The multi-tier cache structure of environment 200 is different than a traditional multi-tier cache system. Instead of the traditional multi-tier cache scenario, where cache size increases and speed decreases traversing down the levels of the hierarchy, a multi-tier cache with a dynamic VSA has speed increasing as the tiers of the cache are traversed up, rather than down.

Thus, environment 200 deviates from the traditional multi-tier cache system size and speed conventions. In one embodiment, the lowest tier of the cache system is storage server SSD (solid state drive) cache tier 240 (SSD tier 240), referring to an SSD or flash device on storage server 110. The next tier is storage server buffer cache tier 230 (buffer cache 230), then dynamic cache VSA 220. In one embodiment, cache tier 240 and cache tier 230 are both included in cache 115 of system 100 (as L3 and L2 respectively, where tier 220 is L1). While both cache tier 240 and cache tier 230 are typically shared across clients and workloads, in one embodiment each dynamic cache VSA 220 instance is dedicated to a specific client. The size of dynamic cache VSA 220, which is closest to client 210, is much larger than buffer cache 230, while SSD cache 220 is also larger than butler cache 230.

In terms of speed, dynamic cache VSA 220 is faster than buffer cache 230, as the storage server sits across a WAN, and buffer cache 230 is faster than SSD cache 240. Dynamic cache VSA 220 is much closer to client 210.

Figure 3:
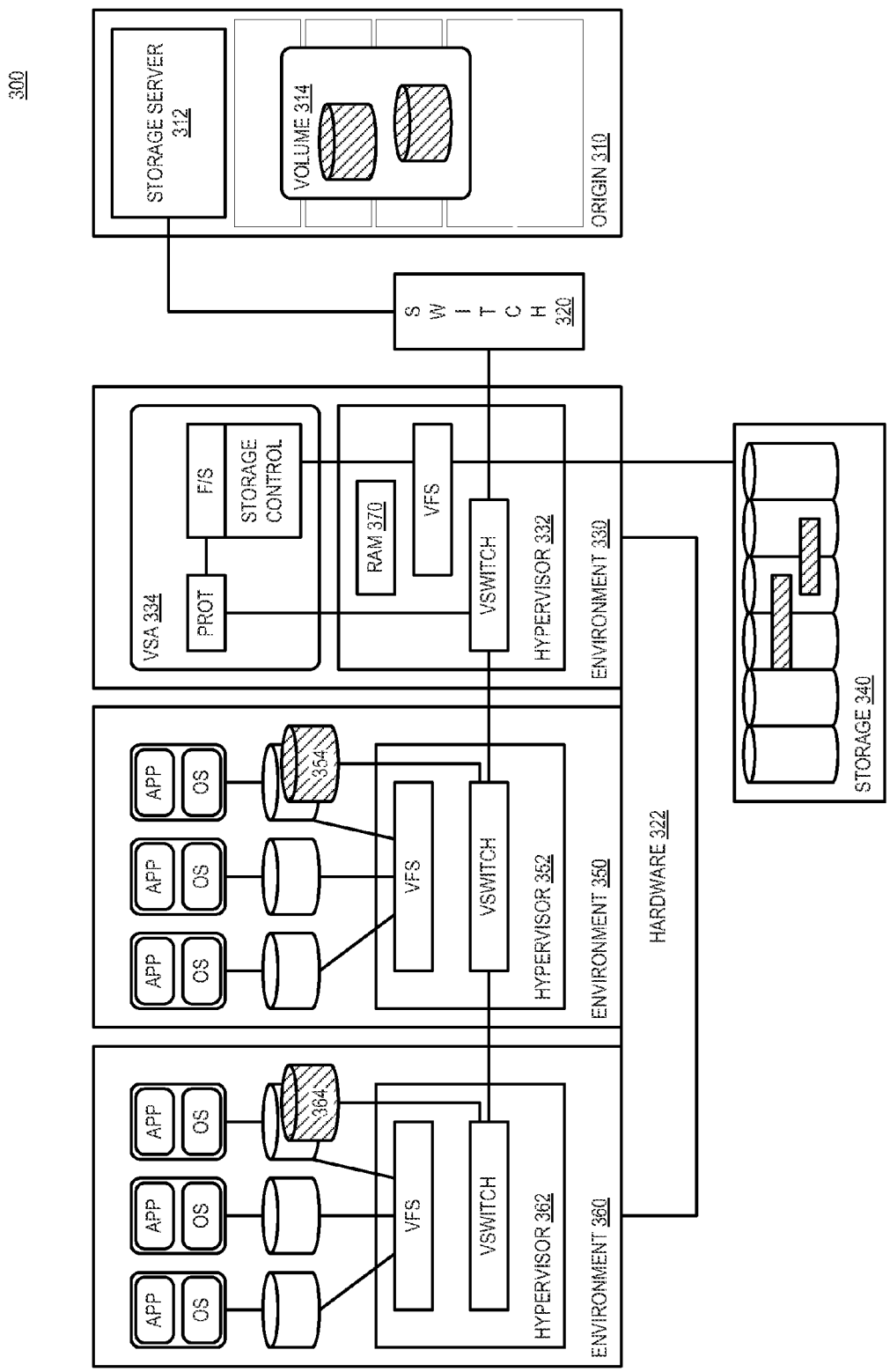
FIG. 3 is a block diagram of an embodiment of a virtual storage server with multiple virtual instances as a cache tier.

FIG. 3 is a block diagram of an embodiment of a virtualized storage server or virtual storage appliance with multiple virtual instances as a cache level. System 300 includes dynamic cache origin 310, which represents an enclosure or backend system for which the dynamic cache VSAs act as caches. Generating the dynamic cache VSAs can be considered to "offload the origin" in that the virtual storage server capabilities of the cache instance on other hardware can reduce the burden on the backend storage server.

Origin 310 includes storage hardware, including storage volume 314, which can be one or more logical groupings of data storage resources. In one embodiment, origin 310 is a blade enclosure with storage resources as well as storage server (controller) resources. Storage server 312 manages the storage resources of origin 310. Requests related to data stored at origin 310 are processed through storage server 312.

Switch 320 represents one or more network resources to allow remote access to storage server 312. As illustrated, switch 320 connects to virtual environments 330, 350, and 360, which are virtualized environments executing on hardware 322.

Virtual environment 330 includes dynamic cache VSA 334 executing on hypervisor 332, which acts as a cache tier for storage server 312. Hypervisor 332, as well as hypervisors 352 and 362 of virtual environments 350 and 360, respectively, include a virtual switch (Vswitch) and a virtual environment filesystem (VFS). Other virtual and/or real environments could also be executed on hardware 322. The virtual switches provide access via the hypervisor to hardware switching resources used to connect to the physical resources of origin 310, and the other virtual environments connected to dynamic cache VSA 334. In one embodiment, hypervisor 332, 352, and 362 are all the same hypervisor, with dynamic cache VSA 334 and virtual environments 350 and 360 being different VMs executing on it. As is understood by those skilled in the art, the applications and operating systems of each virtual environment access the virtual switch of the respective virtual environment as though the switch were actual hardware. The virtualization controller (hypervisor) manages the mapping of virtual resources to hardware resources, for the virtual switches as well as other virtualized physical resources.

In one embodiment, virtual environment 330 hosts the dynamic cache VSA, and virtual environments 350 and 360 host access to clients. As illustrated, environments 350 and 360 are configured identically, with multiple operating system (OS) instances and application instances connecting to the corresponding hypervisor (352 and 362). The configurations do not necessarily have to be identical. In one embodiment, each operating system of virtual environments 350 and 360 represents a separate virtual machine (VM), and there can be one or more applications executing on each operating system. The applications could each represent one or more clients. The virtual switch of each virtual environment 350 and 360 presents an instance representation (354 and 364, respectively) of storage volumes 314 of origin 310.

In one embodiment, the applications are multiple individual threads. In one embodiment, each thread is considered a workload, or one thread is considered an application. The applications are dynamic, and can be opened and closed dynamically, as well as dynamically changing what data and how much data they access.

In one embodiment, dynamic cache VSA 334 is implemented as an instance of an operating system the same or similar to the one executed on storage server 312. Thus, storage server 312 executes a storage server OS natively, white the storage server OS executes virtually on hypervisor 332, hosted remotely from origin 310. Storage server 312 is local to storage volumes 314, while dynamic cache VSA accesses storage volumes 314 remotely via switch 320. Storage resources 340 represent the physical storage resources for virtual environments 330, 350, and 360. In one embodiment, storage resources 340 could be considered part of hardware 322.

Dynamic cache VSA 334 includes protocols and associated drivers and network stacks to communicate over the virtual switch of hypervisor 332. In one embodiment, dynamic cache VSA 334 includes at least NRV and NFS as supported protocols. In one embodiment, origin 310 can be a Fabric Attached Storage (FAS), and export storage volumes to dynamic cache VSA 334 over the NRV protocol. Dynamic cache VSA 334 can then serve the cached volumes to clients of virtual environments 350 and 360 over the NFS protocol.

Dynamic cache VSA 334 also includes a filesystem as well as drivers and management resources for storage 340. A combination of storage 340 and RAM 370 of the hypervisor/host (part of hardware 322) act as the caching device for dynamic cache VSA 334. Because the VSA cache tier is dynamic, space from both DAS 340 and RAM 370 of the hypervisor can be carved out to implement the VSA tier as a dynamic resource. In one embodiment, dynamic cache VSA 334 controls all storage access for all VMs of virtual environments 350 and 360. Data accessed from storage volumes 314 is cached in storage resources 340, and presented as instances 354 and 364 to virtual environments 350 and 360, respectively, by the virtual switches of the respective environments. Each VM can store local data in addition to the data of storage volumes 314.

As mentioned above, dynamic cache VSA 334 can respond to dynamic behavior of different workloads, which are represented either directed or indirectly by the applications of the VMs of virtual environments 350 and 360. The dynamic behavior of the dynamic cache VSA with respect to the various workloads can include operations in accordance with the following examples.

Consider a scenario where the read/write ratio of dynamic cache VSA 334 is high. When the read/write ratio is high, the utility of the dynamic cache VSA is highest. Many reads generally means that cached data will be used, and improve the overall data access throughput. As the ratio of reads to writes decreases, the effectiveness of the dynamic cache VSA also decreases.

As described herein, dynamic cache VSA 334 can detect the read/write ratio and indicate the changes in read/write ratio to origin 310. Thus, dynamic cache VSA 334 can indicate one or more characteristics to the source. In addition to read/write ratio, characteristics such as workload parameters can be monitored and indicated to the source.

Additionally, if a lower tier of the cache system (e.g., a buffer cache or SSD on storage server 312) detects a change in the working set based on a caching policy (stored locally by each caching controller), it can communicate the detected change to the upper level(s) or tier(s) of the cache (e.g., to dynamic cache VSA 334). For example, the buffer cache can indicate that the dynamic cache should not cache so much.

Assume for another example that storage server 312 serves two different workloads that share a data set, with Workload 1 going through dynamic cache VSA 334, and Workload 2 going directly to a buffer cache (not shown) of storage server 312. In such a scenario, dynamic cache VSA 334 is effective in a read-and-read scenario, where both workloads are dominated by read access. However, in a read-and-write scenario, the effectiveness of dynamic cache VSA 334 can go down even if Workload 1 has a high read/write ratio. Observe that if Workload 1 and Workload 2 share the same data set, and Workload 1 has a high read/write ratio while Workload 2 has a much tower read/write ratio then it will be changing the data accessed by Workload 1. Hence, all the data blocks that were cached by Workload 1 and changed by Workload 2 will be invalidated in the cache.

Thus, a low read/write ratio on a workload not even known to dynamic cache VSA 334 could have a negative impact on the effectiveness of the dynamic caching. However, the buffer cache of storage server 312 would be aware of Workload 2 and its access characteristics. Thus, in one embodiment, a lower cache tier (i.e., buffer cache) indicates to a higher cache tier (VSA) to decrease its cache size. Thus, in one embodiment, the buffer cache can direct dynamic cache VSA 334 to cache less, given it is indirectly less useful due to activity by other workloads.

Additionally, in one embodiment, the dynamic cache can detect changes in the working set of an application. If the dynamic cache determines that changes are occurring in the working set, it can indicate more read ahead from a buffer cache or other lower cache tier. In one embodiment, a predetermined rate of cache misses by dynamic cache VSA, 334 can indicate a working set change.

Figure 4:
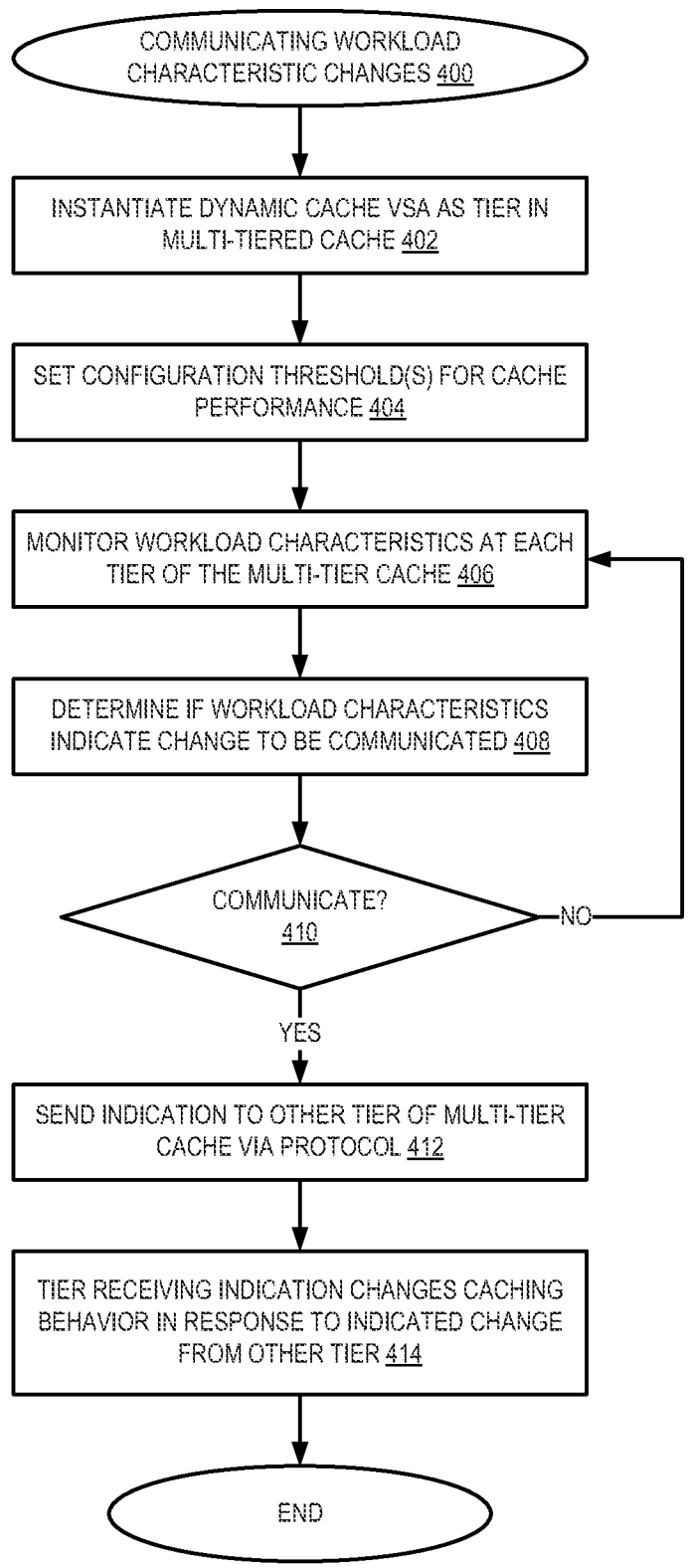
FIG. 4 is a flow diagram of an embodiment of a process for communicating workload characteristic changes among tiers of a multi-tiered cache.

FIG. 4 is a flow diagram of an embodiment of a process 400 for communicating workload characteristic changes among tiers of a multi-tiered cache. In one embodiment, a system (e.g., system 100 or system 300) instantiates a virtual storage appliance as a tier or tier of a cache, process block 402. The instantiation can be independent of a system administrator, such as the system instantiating a virtual storage appliance as needed. In one embodiment, the system instantiates a VSA without input from a system administrator, based on a detected traffic load. The system can instantiate the VSA to reduce a burden on a backend storage server. The system commissions and decommissions the VSA as necessary to reduce load on the storage server.

In one embodiment, the system stores one or more preconfigured thresholds for cache performance, which it loads and sets in the instantiated VSA, process block 404. In an alternate embodiment, the system configures thresholds based on performance of the VSA. In one embodiment, the VSA can tog and monitor performance to determine where breaks or changes in behavior occur. The VSA can execute one or more algorithms to perform calculations to determine where a threshold should be. The VSA can then set the thresholds to match expected or observed behavior of the system.

The VSA monitors performance characteristics of its performance. Other tiers of the cache system likewise monitor their performance characteristics. In one embodiment, different tiers of the cache monitor different parameters, while in an alternative embodiment, all cache tiers monitor the same parameters. As a whole the cache monitors performance characteristics at each tier, process block 406. By the monitoring, the cache determines at each tier if performance characteristics indicate a change in system behavior that should be communicated to another cache tier, process block 408.

If a tier determines that a change should not be communicated, decision block 410, each tier continues to monitor performance, process block 406, and determine if there is anything to indicate to another tier, process block 408. If a tier of the cache determines that a change should be communicated, decision block 410, the tier indicates the change to another or a different tier of the cache in accordance with a communication protocol for communicating to another tier, process block 412. The receiving tier changes or alters its performance in response to the indicated change by the other tier, process block 414.

In one embodiment, as described herein, a multi-tiered cache system is dynamic in its structure, implementing at least one tier of the cache system in a dynamic cache VSA. The multi-tiered cache system enables communication between the levels or tiers of the cache system, which reduces the likelihood of redundancy of effort among tiers of the cache system. The system allocates resources for caching as needed. When caching would result in a performance improvement, the caching system allocates the resources for caching. When caching becomes less effective, the system can de-provision the resources. Thus, rather than having each cache system tier make its own independent determination about how to perform caching based on its local circumstances, lower and higher tiers of the multi-tiered cache system communicate with each other to indicate what patterns and caching decisions are being made.

The improved communication and control of the virtualized dynamic caching can reduce the redundancy of effort. Communication among tiers about workload changes enables a balance between resource availability and workload need. In one embodiment, the communication occurs between controllers or control logic of a dynamic cache VSA and a buffer cache on a storage server.

The caching structure described herein includes at least one tier of caching where control for the tier is implemented as a virtual instance. Virtualization of storage server functionality via a flexible cache VSA or dynamic cache VSA can improve resource utilization in a caching system. Not only can a cache system dynamically create (instantiate) or destroy flexible cache VSA instances having storage server functionality as needed, the caching system can dynamically revise or change instances when needed. Thus, the multi-tiered cache caching system described herein dynamically obtains and releases resources in accordance with availability and need.

In one embodiment, a storage server includes multiple caching tiers, for example, a flash or SSD tier, and a buffer cache tier. A dynamic cache VSA provides another caching tier that sits outside the storage server, and logically above the buffer cache tier. The multi-tier cache communication described herein can be referred to as a multi-tier cache communication protocol. In one embodiment, the protocol is an end-to-end protocol from the dynamic cache VSA to the storage server's buffer cache and flash or SSD cache.

Communication via the protocol enables the dynamic cache VSA to communicate changes in workload characteristics to the storage server cache tiers. In one embodiment, indication of the changes to the storage server triggers the storage server, for example, to alter read-ahead policy and/or alter the size of the buffer cache on the storage server. Thus, if the sequential-random ratio of data access requests increases, the buffer cache tier can calculate a proportional increase in the read-ahead size and issue I/Os. If the buffer cache tier is under a resource crunch, read-ahead blocks can be cached in a flash/SSD tier. The buffer cache tier can make a similar decision when the data access arrival rate of the workload increases.

In one embodiment, the dynamic cache VSA communicates a size change of the dynamic cache VSA to the storage server to affect the caching policy of the flash/SSD tier. For example, if the dynamic cache VSA is completely destroyed (de-provisioned or de-commissioned), the storage server's various caching tiers, such as buffer cache tier and flash/SSD tier, should be prepared to take the increased load of the de-commissioned dynamic cache VSA. Before de-commissioning the dynamic cache VSA, the dynamic cache VSA should propagate all the workload characteristics to the storage server. The workload characteristics information can aid a feedback controller on the storage server to estimate the size of each of the caching tiers.

In one embodiment, such a feedback controller is configured to take into consideration multiple workloads sharing the same set of caches (buffer cache, SSD). When multiple workloads share the same set of caches, operation by one workload can affect cache performance with respect to the other workload. For example, if one workload is write-heavy and the other read-heavy, having a large cache at one tier may not make sense, given a high likelihood of invalidating data stored in the cache. Thus, even though a read-heavy workload can normally be a good candidate for a large amount of cache at one tier, in the case where caching resources are shared by different workloads, it can make more sense to reduce the cache size in at least one tier under certain circumstances.

In one embodiment, whenever the dynamic cache VSA detects change in the working set, it communicates the change to the storage server. In one embodiment, a change is only "detected" in the sense of communicating the change when the change is higher than a threshold. In one embodiment, the threshold is based on a number of cache misses within a period of time. In one embodiment, a system administrator sets a cache system with preconfigured thresholds. Alternatively, in one embodiment, the cache system dynamically determines thresholds by control logic in the cache system based on historical monitoring. Communicating the changes in working set to the storage server enables the buffer cache tier to appropriately adjust read-ahead of data blocks. For example, read-ahead can be more aggressively applied even if a sequential-random ratio is the same as before, based on an indication of a change in working set.

In one embodiment, the communication occurs only within the storage server, and not from the dynamic cache VSA to the storage server. One scenario where the communication happens only within the storage server is as follows. If a read request to the storage server comes as a result of a cache miss at the dynamic cache VSA, then there is no point for the storage server's buffer cache to retain that buffer after the data is transferred to the dynamic cache VSA. This is because all the future read accesses to that data block will be fulfilled by the dynamic cache VSA and buffer cache's copy will be redundant.

In one embodiment, a tagging function is used with communication across the cache tiers within the storage server. In such an embodiment, a dynamic cache VSA has a dynamic cache ID. With the tagging functionality, all data access requests made to the storage server e.g., D-blade) on behalf of the protocol requests from the dynamic cache VSA can be tagged with the dynamic cache ID. For example, if the dynamic cache VSA tags a read request with a dynamic cache ID, the buffer cache tier can evict the buffer as soon as it is transferred. Evicting from the buffer cache tier could include either evicting it completely or requesting an SSD tier to save it. Similarly, for a write request the buffer cache tier can evict the buffer soon after it is written to nonvolatile RAM (Random Access Memory). Such a technique can be referred to as self-eviction.

It will be understood that not all workloads accessing a particular storage are accessed through a dynamic cache VSA, and a storage server can support many dynamic cache VSAs. One benefit of not storing redundant data on the buffer cache tier is that the cache system can allocate more space to other workloads that are coming directly to the storage server, or indirectly through other dynamic cache VSAs. Thus, memory resource utilization is improved.

It will be understood that the dynamic cache VSA as described herein is not a victim cache for the storage server's buffer cache. Thus, self-eviction as mentioned above is different from traditional multi-tiered protocols. With self-eviction as described above, the buffer cache tier evicts data on its own will, when the data is redundant.

In one embodiment, the storage server implements NAS (Network Attached Storage) over a WAN. Traditional cache protocols that may work in a SAN (Storage Area Network) scenario, do not necessarily work with NAS due to the differences in access of the data between SAN and NAS. The augmented cache protocol described herein allows cache communication between a dynamic cache VSA and storage server, and can be used to augment either NAS or SAN implementations. The communication described herein is also distinct from dynamic partitioning across multiple cache tiers at least because there does not need to be any explicit partitioning at the different cache tiers. Dynamic partitioning explicitly partitions and then evaluates its impact using statistical regression. As described herein, each tier can simply determine what workload characteristics are observed at the tier, and then communicate those observations to other tiers.

As described above, the controller monitors for changes in cache environment, and in response to changes, triggers cache re-sizing or re-partitioning at various cache tiers. The following scenarios illustrate embodiments of situations where the controller will trigger communication across multiple tiers of the cache system, as well as triggering changes at the tier of the controller. It will be understood that not all scenarios apply the same to each cache tier, or that different scenarios may be a little different for different tiers.

Assume a configuration with three cache tiers L1-L3, where L1 is implemented as a dynamic cache YSA, and L2 and L3 reside on a storage server, with L2 as buffer cache and L3 as SSD or flash on the storage server. The following cases show examples of communication between tiers of a multi-tier cache. Each tier controller includes a local caching policy, indicating how it performs caching, such as how much to cache, and what objects to cache. Each tier controller also follows protocol rules regarding what information to send when, and to what other tiers (or the controller of the other tiers), Thus, the following cases provide examples of implementation of a multi-tier caching communication protocol.

In one embodiment, for Cases 1-4, L1 will trigger communication to L2 (e.g., a buffer cache on the storage server). In one embodiment, for Cases 5-7, L2 will communicate with L3 (e.g., an SSD on the storage server). In one embodiment, for Cases 8-10, L2 will communicate to L1 or L3 will communicate with L2.

Case 1 occurs when workload characteristic changes. If the read-write ratio Dora workload coming from a client goes below a threshold, the dynamic cache VSA will no longer be useful, given that the workload becomes write-intensive. Similarly, if the I/O arrival rate declines, a dynamic cache VSA, might not be needed. With either of these workload characteristic changes, the cache system may determine to decommission the dynamic cache VSA. Thus, the L1 controller communicates to L2 to indicate the change. Once the L2 and/or L3 controllers change their caching policies to absorb the workload change, L2 can inform L1 of the changes, and decommission the L1 cache. If arrival rates have declined, then the controller of L1 should inform L2 that it does not need to increase its own cache size while L1 is decommissioned.

Another example of Case 1 is if the sequential-random ratio has increased and the entire dataset belonging to the sequential access cannot be accommodated in such a circumstance, L1 can inform L2 to increase its partition size to pre-fetch and store the blocks from the main storage. If L2 cannot accommodate the entire dataset, it can similarly send a communication requesting L3 to increase its partition size for the workload, to cause L3 to pre-fetch the data.

Case 2 occurs when a working set size increases or decreases. If the controller at L1 determines that a working set size has increased, it can increase the cache size at its level, assuming such resources are available at the hypervisor. If the resources are not available at L1, then Case 4 applies as described below. The controller can determine that the working set size has changed by observing an improvement in cache hit ratio with increase in cache size and the workload characteristics.

Case 3 occurs when a working set has changed. The controller of L1 can determine that the working set has changed if the miss rate at L1 starts increasing and/or workload characteristics have changed. In such a scenario, the L1 controller retrieves the working set size and workload characteristic and communicates it to L2. The communication to L2 prompts the L2 controller to perform read-ahead, and estimate the optimal partition size for the particular workload at its own level. Depending upon resource availability at L2, the controller will inform L3 whether it needs to re-partition itself.

Case 4 occurs when resource availability does not support an increase in the cache size at L1. If the controller of L1 can no longer increase the L1 cache size due to shortage of HDD or SSD space on the hypervisor, the controller communicates this information to L2. The L1 controller can determine the resource scarcity at its tier by looking at the estimated working set size. If the estimate is greater than the available L1 cache size, then there is a resource scarcity and L1 cannot completely absorb the working set for that workload. In this case, the controller of L1 informs L2 and/or L3 (or L2 can then inform L3) of the workload characteristic, and how much more cache size is needed. Based on this information a controller of one of the other tiers can decide to re-partition and warm up their respective caches.

Case 5 occurs when the L1 tier makes a sizing request. If the controller of L1 communicates to the controller of L2, and cannot accommodate the workload's dataset, the controller of L2 can then communicate the workload information and cache size request to L3. Thus, the controller of one cache tier can communicate to a tier below it on behalf of the tier above it. For example, in Cases 1 and 3, if a heavy load of requests is expected to come to the storage server, and the load cannot be stored completely in a buffer cache at the storage server, the controller of L3 sizes L3 to pre-fetch the data based on the workload pattern communicated by L1 to help improve performance.

Case 6 occurs when any of the above Cases result in workloads that run directly on L2 without an L1 cache tier. The L2 controller behaves in a similar fashion as the L1 controller as described above, except that it cannot be decommissioned. Additionally, in one embodiment, L2 might be shared across multiple workloads and not be exclusive to a workload as an L1 cache tier can be. Thus, depending on the availability of RAM and the demand from other workloads, the controller of L2 can request L3 to increase its partition size for a workload. In one embodiment, L2 performs better for write-intensive loads than L1. Thus, whereas the controller of L1 may only request a partition size increase in L2 for read-intensive loads, the controller of L2 can request an increase in partition size from L3 for either read or write caching.

Case 7 occurs when a controller detects the addition or deletion of workloads. If a new workload is provisioned directly on the storage server, the controller of the L2 tier will have to resize, or reduce the buffer cache of a different workload shared on L2 to meet the requirements of the new workload. In such a case the controller of L2 can indicate the change to L3, which may prompt the controller of L3 to increase caching for one or more workloads (including the newly added one). Similarly, if a workload is deleted or is no longer running on L2 directly, other workloads can get a larger share of L2. The controller of L2 can indicate the deletion of a workload to L3, which can trigger the controller of L3 to decrease the L3 partition size for the workloads getting a bigger share of L2 cache.

Case 8 occurs where workload characteristic and resource availability cause competition among workloads on L2. If L2 has for example 10 workloads running on it directly—all sharing the L2 cache, the workloads will compete significantly for the resources of L2, if one or more workloads exhibit a high read-write ratio (and would thus benefit from a dedicated L2 cache), the L2 controller can request dynamic instantiation of an L1 cache close to the client for the one or more workloads. In one embodiment, the L2 controller will need to communicate with the hypervisor to instantiate the L1 cache. The L2 controller may only be successful in requesting the L1 cache if enough resources are available at the hypervisor to create the L1 tier. If an L1 tier is created, the load for the workload at is decreased, and the controller of L2 will distribute resources to other competing workloads, in one embodiment, if the L2 and L3 tiers have sufficient resources, as determined by their controllers, to absorb the I/Os from a workload on L1, the L2 controller can decommission the L1 tier for that workload.

Case 9 occurs where overlap between datasets increases, Consider workload 1 and workload 2 sharing the same dataset on a storage server. Suppose workload 1 is a read-intensive workload and hence accesses data through an L1 tier, but workload 2 is a write-intensive workload and writes data directly to the L2 tier. In this case, the L1 cache of workload 1 is invalidated very frequently, and hence there is little or no benefit in the cache system from L1. Thus, the L2 controller will be able to determine that the L1 tier provides little or no benefit, and can either decrease the size of the L1 cache for workload 1 or decommission it completely.

Case 10 occurs where overlap between datasets decreases. Case 10 is the opposite of Case 9. In this case, if the resource availability at L2 is low, it makes sense to create new L1 tiers or increase the size of existing tiers to lower the contention at L2.

In one embodiment, a multi-tier cache communication protocol includes various APIs (Application Programming Interfaces). The description herein can apply to either a protocol that is natively configured to have the APIs or their equivalent functionality, or to a protocol that is modified to have the APIs or their equivalent functionality. The APIs can be used by any cache tier. Among other APIs that can exist, in one embodiment the following are included.

An API call to notify a change in size of a dynamic cache VSA can be of a form SIZE_CHANGE_NOTIFY(IN long current_cache_sz, prev_cache_sz, IN long wss).

Whenever the controller at a particular cache tier resizes its own cache size, and if the resizing amount is above a threshold (static or dynamic), the controller can instruct a different cache tier of the information. Here, the current_cache_sz and prev_cache_sz are the current and previous cache sizes of the present cache tier that is calling the API. The previous cache size is the one that was last communicated. The API also communicates the estimated wss by the present cache tier. This API can be used in Cases 2, 4, 5, and 7, referring to the Cases described above.

An API call to notify changes in workload can be of a form WORKLOAD_CHANGE_NOTIFY(IN struct workload_characteristic *, IN tong wss). Whenever the controller detects a change in the workload characteristics or the working set size (wss), it calls this API to communicate the information to another cache tier. This API can be used in Cases 1, 2, 5, 6, and 8.

An API call to notify a change in the working set can be of a form WORKINGSET_CHANGE_NOTIFY(IN staid workload_characteristic *, long wss). This API is used whenever the controller senses that working set has changed. It is used in Case 3 and can be used in Case 6.

An API call to set the cache size can be of a form SET_CACHE_SIZE(IN cache_size, IN struct workload_characteristic *, IN long wss). This API is used by the controller to set the size of a higher or tower cache tier directly. For example, L2 can use this API to instantiate or decommission an L1 tier as in Cases 7, 8, 9, and 10.

It will be understood that any combination of the events described above can occur simultaneously. In such a case, the different events could either be communicated independently or batched up into one notification.

The APIs described above are exemplary, and similar and/or additional APIs could be used in a system. The APIs described form one part of the communication in the system—the communication between the dynamic cache VSA and the storage server. Another part of the multi-tier cache communication requires support from the storage server to communicate the dynamic cache VSA information to the buffer cache tier and flash/SSD tier. In one embodiment, a storage server includes an N-blade for network communication, and a D-blade for data access. At the storage server, in one embodiment, the N-blade maintains a mapping of the dynamic cache VSA (such as an Internet Protocol mapping), dynamic cache ID, and dynamic cache attributes.

In one embodiment, each dynamic cache VSA is associated with a unique ID—dynamic cache 10, which is generated in conjunction with the dynamic cache VSA that is instantiated. Thus, the ID is generated as part of generating the dynamic cache VSA instance or created after the instance is created. The mapping can include dynamic cache VSA attributes like workload characteristics, dynamic cache size, and working set change as indicated by the control calls, mentioned above. In one embodiment, whenever any I/O (data access) request is made to the storage server (e.g., D-blade) on behalf of a request arriving from a dynamic cache VSA, it includes a tag with the corresponding dynamic cache ID. The buffer cache tier looks into the attributes corresponding to the dynamic cache ID to make appropriate caching, and read-ahead decisions.

As described herein, the communication between tiers of the cache system can improve utilization of a system where the dynamic cache VSA is hosted. Additionally, the system adapts dynamically to the dynamics of the applications accessing data through the dynamic cache VSA and storage server, which in turn improves the overall performance of the application. The multi-tier protocol expedites the response time of the backend storage server to changes on the external caching tier. Thus, the system adapts much quicker to changes in behavior of the applications.

Data access in a data center is often highly dynamic. As described above, the multi tiered cache system can respond to changes in a highly dynamic environment by quickly changing behavior of the caching. Thus, better resource utilization is accomplished. In addition to having dynamic caching changes, the ability to create dynamic caching in VMs allows another layer of adaptability in that virtual caching elements (VSAs) can be dynamically allocated and de-allocated, which makes better use of hardware resources than having a dedicated hardware resource to perform the caching.

Figure 5:
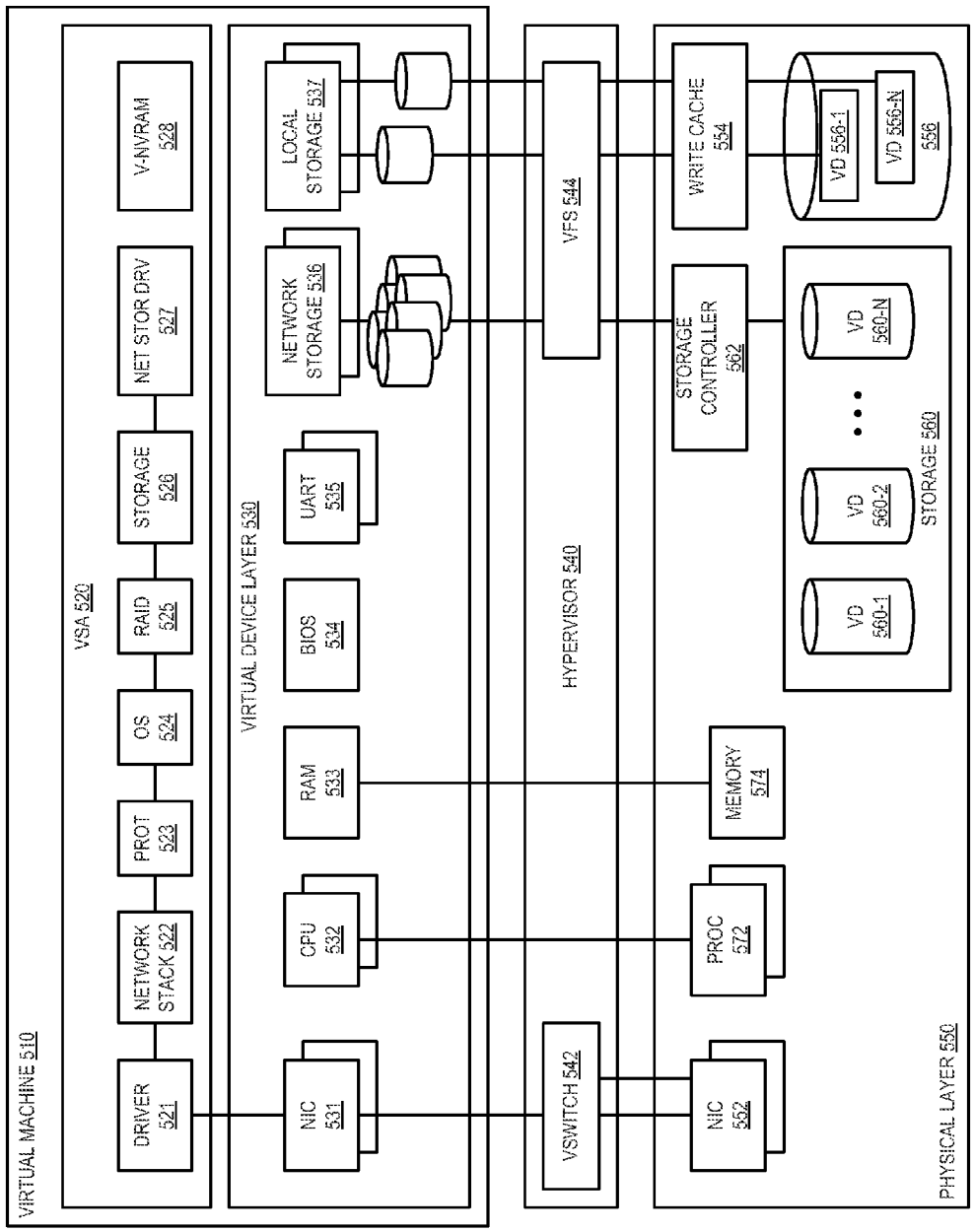
FIG. 5 is a block diagram of an embodiment of a virtual storage server.

FIG. 5 is a block diagram of an embodiment of a virtual storage server usable in a multi-tiered cache with a virtual storage appliance. System 500 is a representation of a virtual environment (e.g., environments 330, 350, 360 of FIG. 3). Physical layer 550 includes the hardware resources that execute virtual machine 510, via hypervisor 540. Hypervisor 540 can be implemented as any virtualization engine, and includes virtual switch 542 and virtual filesystem 544. Virtual switch 542 maps network and communication resources from virtual device layer 530 to hardware resources of physical layer 550. Similarly, virtual filesystem 544 represents one or more filesystem resources that map networked (shared) storage resources and local (non-shared) storage resources of physical layer 550.

Physical layer 550 is depicted with various components that can be present in whole or in part, and additional components or subcomponents can also be present. Physical layer 550 includes one or more processors or processing resources 572, which execute instructions and can perform various operations as described herein. Processor 572 can include any type of microprocessor, central processing unit (CPU), processing core (including multi-core devices or other processing devices.

Memory 574 represents the main memory for system 500, and provides temporary storage for code (e.g., software routines or series of instructions, commands, operations, programs, data) to be executed by processor 572. Memory 574 can include read-only memory (ROM), flash memory, one or more varieties of random access memory (RAM), or the like, or a combination of such devices.

The various components of physical layer 550 can be coupled by one or more buses 576. Bus 576 is an abstraction that represents any one or more separate physical buses, communication lines, and/or point-to-point connections, connected by appropriate bridges, adapters, and/or controllers. Therefore, bus 576 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire").

Physical layer 550 includes one or more network interfaces (NIC) 552, which represent hardware and software (e.g., drivers) that enable physical layer 550 to connect and communicate with remote devices over one or more networks. In one embodiment, physical layer 550 includes storage resources separated as local to a particular virtual environment, and other shared data (e.g., shared or cached data for a dynamic cache VSA). For example, storage resources 560 represent the cached data shared among multiple virtual environments, white storage 556 represents local storage.

Storage 556 includes resources for implementing a write cache 554, which is mapped by virtual filesystem 544 to virtual machine 510 to store the data written for various clients. Storage 556 can be separated into multiple virtual disks (VD) 556-1 through 556-M. The virtualization of disks is merely for purposes of storage management and organization, and can be performed in any way known in the art.

Storage 560 includes storage resources for implementing a virtual cache layer, with resources separated as virtual disks 560-1 through 560-N. Typically N will be an integer much larger than M. Controller 562 provides physical-tier management of the storage. The options for control or management of storage 560 vary widely, depending on the desired implementation. For example, controller 562 can be implemented as a JBOD (Just a Bunch Of Disks) controller, a RAID (Redundant Array of Independent/Inexpensive Disks/Drives controller, or other controller.

Thus, it will be understood that storage 560, in addition to being a virtual resource, can be managed with abstraction layers to allow a logical disk organization. In one embodiment, the abstraction convention implemented in system 500 is the same as the abstraction used by a backend storage server at the data origin (e.g., storage server 312 of origin 310 in FIG. 3). However, the abstraction convention at system 500 could be different from a backend storage server that is the source of the cached data.

Virtual device layer 530 represents the virtual device as mapped by hypervisor 540. In one embodiment, virtual device 530 includes network interface 531, CPU 532, RAM 533, BIOS (Basic Input/Output System) 534, UART (Universal Asynchronous Receiver-Transmitter) 535, network storage 536, and local storage 537. Network interface 531 enables virtual device 510 to access other devices across networks via network interface(s) 552. CPU 532 represents the processing resources available to virtual machine 510, which consists of dedicated and/or shared processing resources 572.

RAM 533 represents memory resources allocated to virtual machine 510, and includes shared and/or dedicated resources of memory 574. BIOS 534 provides resources to initialize the software and virtual systems on the allocated hardware resources. UART 535 represents direct-connection resources, rather than point-to-point or network connection resources. Network storage 536 enables virtual machine 510 to access storage 560 via virtual filesystem 544 and controller 562. Local storage 537 can provide, for example, persistent write cache 554 for storing data at system 500.

Each of the components described at virtual device layer 530 has a physical complement at physical hardware layer 550. Hypervisor 540 maps the resources of virtual device layer 530 to its complement in physical hardware layer 550. Virtual device layer 530 is illustrated as included in virtual machine 510, but it will be understood that the resources are included virtually. Virtual machine 510 includes virtual storage appliance (VSA) 520 (which could also be referred to as a virtual storage adapter), which has access to the resources of virtual device layer 530 as the available computing resources.

VSA 520 includes software and drivers that manage and control the virtual resources, VSA 520 presents the virtual resources to the applications or workloads that execute on virtual machine 510. In one embodiment, VSA 520 includes driver 521, network stack 522, protocol(s) 523, OS 524, RAID 525, storage controller 526, network storage driver 527, and virtual nonvolatile RAM (V-NVRAM) 528.

Driver 521 provides driver resources to drive communication via the network interfaces. Network stack 522 implements one or more communication stacks for protocol(s) 523. Protocol(s) 523 include the one or more protocols used by virtual machine 510 to communicate with networked devices. Operating system 524 controls the flow of operation in virtual machine 510. RAID 525 represents any type of storage abstraction used for managing storage, with one of the various versions of RAID being common types. Many abstraction types are possible. Storage controller 526 can include, for example, a storage stack and storage drivers used to access storage resources. Network storage driver 527 provides one type of driver for access to storage area networks (SANs), network area storage (NAS), or other networked storage. Virtual nonvolatile RAM 528 represents drivers for local storage of virtual machine 510.

Figure 6A:
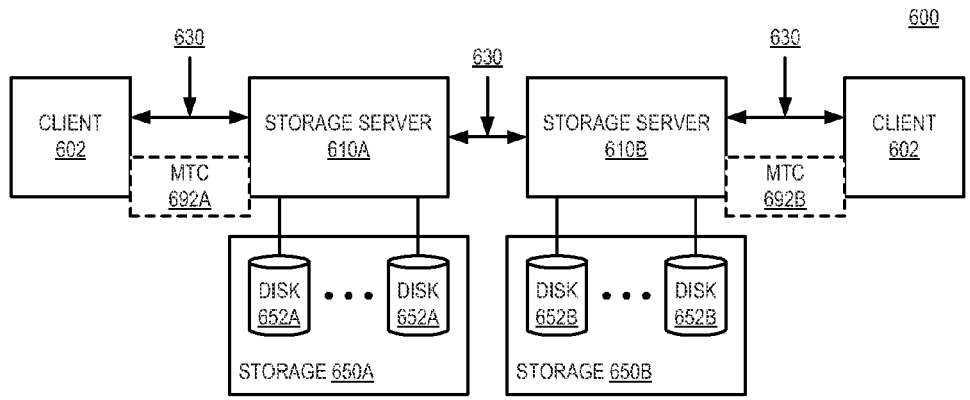
FIG. 6A illustrates a network storage system in which a multi-tiered cache with a virtual storage appliance can be implemented.

FIG. 6A shows network storage system 600 in which a multi-tiered cache with a virtual storage appliance can be implemented. Storage servers 610 (storage servers 610A, 610B) each manage multiple storage units 650 (storage 650A, 650B) that include mass storage devices. These storage servers provide data storage services to one or more clients 602 through a network 630. Network 630 can be, for example, a local area network (LAN), wide area network (WAN), metropolitan area network (MAN), global area network such as the Internet, a Fibre Channel fabric, or any combination of such interconnects. Each of clients 602 can be, for example, a conventional personal computer (PC), server-class computer, workstation, handheld computing or communication device, or other special or general purpose computer.

Storage of data in storage units 650 is managed by storage servers 610 which receive and respond to various read and write requests from clients 602, directed to data stored in or to be stored in storage units 650. Storage units 650 constitute mass storage devices which can include, for example, flash memory, magnetic or optical disks, or tape drives, illustrated as disks 652 (652A, 652B). Storage devices 652 can further be organized into arrays (not illustrated) implementing a Redundant Array of Inexpensive Disks/Devices (RAID) scheme, whereby storage servers 610 access storage units 650 using one or more RAID protocols known in the art.

Storage servers 610 can provide file-level service such as used in a network-attached storage (NAS) environment, block-level service such as used in a storage area network (SAN) environment, a service which is capable of providing both file-level and block-level service, or any other service capable of providing other data access services. Although storage servers 610 are each illustrated as single units in FIG. 6A, a storage server can, in other embodiments, constitute a separate network element or module (an "N-module") and disk element or module (a "D-module"). In one embodiment, the D-module includes storage access components for servicing client requests. In contrast, the N-module includes functionality that enables client access to storage access components (e.g., the D-module), and the N-module can include protocol components, such as Common Internet File System (CIFS), Network File System (NFS), or an Internet Protocol (IP) module, for facilitating such connectivity. Details of a distributed architecture environment involving D-modules and N-modules are described further below with respect to FIG. 6B and embodiments of a D-module and an N-module are described further below with respect to FIG. 8.

In one embodiment, storage servers 610 are referred to as network storage subsystems. A network storage subsystem provides networked storage services for a specific application or purpose, and can be implemented with a collection of networked resources provided across multiple storage servers and/or storage units.

In the embodiment of FIG. 6A, one of the storage servers (e.g., storage server 610A) functions as a primary provider of data storage services to client 602. Data storage requests from client 602 are serviced using disks 652A organized as one or more storage objects. A secondary storage server (e.g., storage server 610B) takes a standby role in a mirror relationship with the primary storage server, replicating storage objects from the primary storage server to storage objects organized on disks of the secondary storage server (e.g., disks 650B). In operation, the secondary storage server does not service requests from client 602 until data in the primary storage object becomes inaccessible such as in a disaster with the primary storage server, such event considered a failure at the primary storage server. Upon a failure at the primary storage server, requests from client 602 intended for the primary storage object are serviced using replicated data (i.e. the secondary storage object) at the secondary storage server.

It will be appreciated that in other embodiments, network storage system 600 can include more than two storage servers. In these cases, protection relationships can be operative between various storage servers in system 600 such that one or more primary storage objects from storage server 610A can be replicated to a storage server other than storage server 610B (not shown in this figure). Secondary storage objects can further implement protection relationships with other storage objects such that the secondary storage objects are replicated, e.g., to tertiary storage objects, to protect against failures with secondary storage objects. Accordingly, the description of a single-tier protection relationship between primary and secondary storage objects of storage servers 610 should be taken as illustrative only.

In one embodiment, network storage system 600 includes multi-tiered cache (MTC) 692 (692A, 692B). The multi-tiered cache is implemented with one or more cache elements at the storage servers, and one or more elements across the network at the client side. Thus, MTC 692A and MTC 692B are illustrated, respectively, as between storage server 610A and client 602 and storage server 610B and client 602.

Figure 6B:
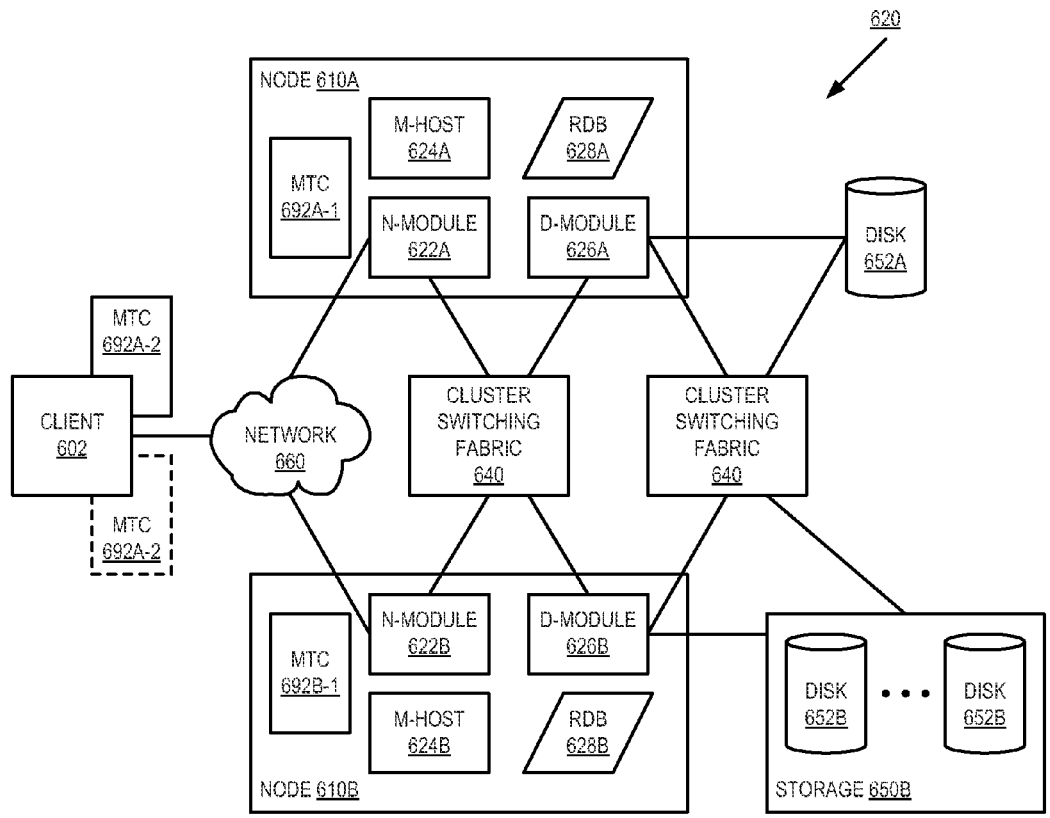
FIG. 6B illustrates a distributed or clustered architecture for a network storage system in which a multi-tiered cache with a virtual storage appliance can be implemented in an alternative embodiment.

FIG. 6B illustrates a distributed or clustered architecture for a network storage system in which a multi-tiered cache with a virtual storage appliance can be implemented in an alternative embodiment. System 620 can include storage servers implemented as nodes 610 (nodes 610A, 610B) which are each configured to provide access to storage devices 652. In FIG. 6B, nodes 610 are interconnected by a cluster switching fabric 640, which can be embodied as an Ethernet switch.

Nodes 610 can be operative as multiple functional components that cooperate to provide a distributed architecture of system 620. To that end, each node 610 can be organized as a network element or module (N-module 622A, 622B), a disk element or module (D-module 626A, 626B), and a management element or module (M-host 624A, 624B). In one embodiment, each module includes a processor and memory for carrying out respective module operations. For example, N-module 622 can include functionality that enables node 610 to connect to client 602 via network 630 and can include protocol components such as a media access layer, Internet Protocol (IP) layer, Transport Control Protocol (TCP) layer, User Datagram Protocol (UDP) layer, and other protocols known in the art.

In contrast, D-module 626 can connect to one or more storage devices 652 via cluster switching fabric 640 and can be operative to service access requests on devices 650. In one embodiment, the D-module 626 includes storage access components such as a storage abstraction layer supporting multi-protocol data access (e.g., Common Internet File System protocol, the Network File System protocol, and the Hyper-text Transfer Protocol), a storage layer implementing storage protocols (e.g., RAID protocol), and a driver layer implementing storage device protocols (e.g., Small Computer Systems Interface protocol) for carrying out operations in support of storage access operations. In the embodiment shown in FIG. 6B, a storage abstraction layer (e.g., file system) of the D-module divides the physical storage of devices 650 into storage objects. Requests received by node 610 (e.g., via N-module 622) can thus include storage object identifiers to indicate a storage object on which to carry out the request.

Also operative in node 610 is M-host 624 which provides cluster services for node 610 by performing operations in support of a distributed storage system image, for instance, across system 620. M-host 624 provides cluster services by managing a data structure such as a RDB 628 (RDB 628A, RDB 628B) which contains information used by N-module 622 to determine which D-module 626 "owns" (services) each storage object. The various instances of RDB 628 across respective nodes 610 can be updated regularly by M-host 624 using conventional protocols operative between each of the M-hosts (e.g., across network 630) to bring them into synchronization with each other. A client request received by N-module 622 can then be routed to the appropriate D-module 626 for servicing to provide a distributed storage system image.

In one embodiment, node 610A includes MTC 692A-1 and node 610B includes MTC 692B-1, MTC 692A-1 and MTC 692B-1 illustrate elements of a multi-tiered cache, which elements are included at nodes 610A and 610B. The elements are one or more tiers of the multi-tiered cache. Each cache tier is managed by a corresponding or associated controller. MTC 692A-2 is shown at the client side, and is another tier of a multi-tiered cache including MTC 692A-1. There can be one or more cache tiers at client 602 that communicate with the tier(s) at the node to indicate changes of workload, which in turn changes the operation of the cache. MTC 692B-2 at client 602 is illustrated with a dashed line to represent the fact that the tiers may be dynamically instantiated or allocated, and dynamically de-allocated.

It will be noted that while FIG. 6B shows an equal number of N- and D-modules constituting anode in the illustrative system, there can be different number of N- and D-modules constituting a node in accordance with various embodiments. For example, there can be a number of N-modules and D-modules of node 610A that does not reflect a one-to-one correspondence between the N- and D-modules of node 610B. As such, the description of a node comprising one N-module and one D-module for each node should be taken as illustrative only.

Figure 7:
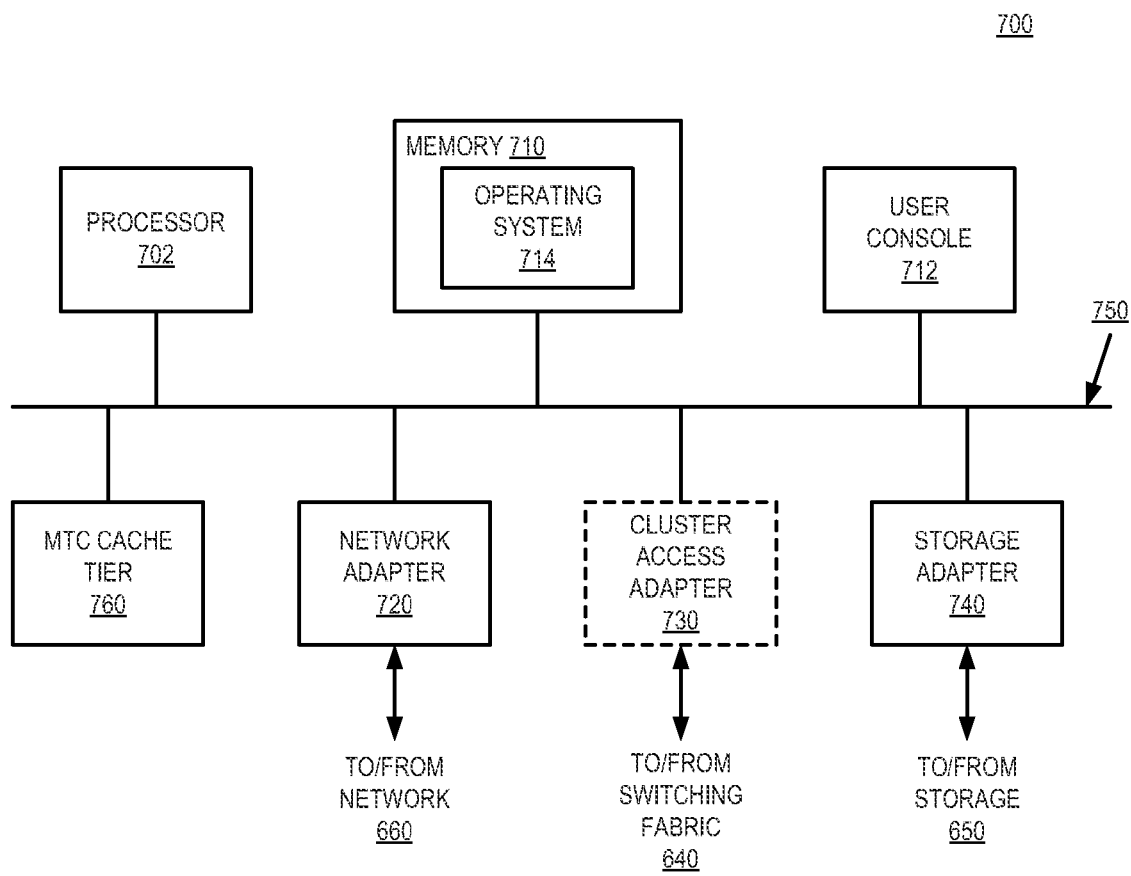
FIG. 7 is a block diagram of an illustrative embodiment of an environment including a protection manager of FIGS. 6A and 6B in which a multi-tiered cache with a virtual storage appliance can be implemented.

FIG. 7 is a block diagram of an embodiment of a storage server, such as storage servers 610A and 610B of FIG. 6A, embodied as a general or special purpose computer 700 including a processor 702, a memory 710, a network adapter 720, a user console 712 and a storage adapter 740 interconnected by a system bus 750, such as a convention Peripheral Component Interconnect (PCI) bus.

Memory 710 includes storage locations addressable by processor 702, network adapter 720 and storage adapter 740 for storing processor-executable instructions and data structures associated with a multi-tiered cache with a virtual storage appliance. A storage operating system 714, portions of which are typically resident in memory 710 and executed by processor 702, functionally organizes the storage server by invoking operations in support of the storage services provided by the storage server. It will be apparent to those skilled in the art that other processing means can be used for executing instructions and other memory means, including various computer readable media, can be used for storing program instructions pertaining to the inventive techniques described herein. It will also be apparent that some or all of the functionality of the processor 702 and executable software can be implemented by hardware, such as integrated currents configured as programmable logic arrays, ASICs, and like.

Network adapter 720 comprises one or more ports to couple the storage server to one or more clients over point-to-point links or a network. Thus, network adapter 720 includes the mechanical, electrical and signaling circuitry needed to couple the storage server to one or more client over a network. Each client can communicate with the storage server over the network by exchanging discrete frames or packets of data according to pre-defined protocols, such as TCP/IP.

Storage adapter 740 includes a plurality of ports having input/output (I/O) interface circuitry to couple the storage devices (e.g., disks) to bus 750 over an I/O interconnect arrangement, such as a conventional high-performance, FC or SAS link topology. Storage adapter 740 typically includes a device controller (not illustrated) comprising a processor and a memory for controlling the overall operation of the storage units in accordance with read and write commands received from storage operating system 714. As used herein, data written by a device controller in response to a write command is referred to as "write data," whereas data read by device controller responsive to a read command is referred to as "read data."

User console 712 enables an administrator to interface with the storage server to invoke operations and provide inputs to the storage server using a command line interface (CLI) or a graphical user interface (GUI). In one embodiment, user console 712 is implemented using a monitor and keyboard.

In one embodiment, computing device 700 includes cache tier 760. Cache tier 760 includes a cache element and an associated controller to manage the cache tier. There can be multiple cache tiers included in computing device 700, implemented in either memory 710, or a special-purpose storage element on computing device 700. The controller of cache tier 760 communicates with a controller on a cache tier at a client device, as described above.

When implemented as a node of a cluster, such as cluster 620 of FIG. 6B, the storage server further includes a cluster access adapter 730 (shown in phantom) having one or more ports to couple the node to other nodes in a cluster. In one embodiment, Ethernet is used as the clustering protocol and interconnect media, although it will apparent to one of skill in the art that other types of protocols and interconnects can by utilized within the cluster architecture.

Figure 8:
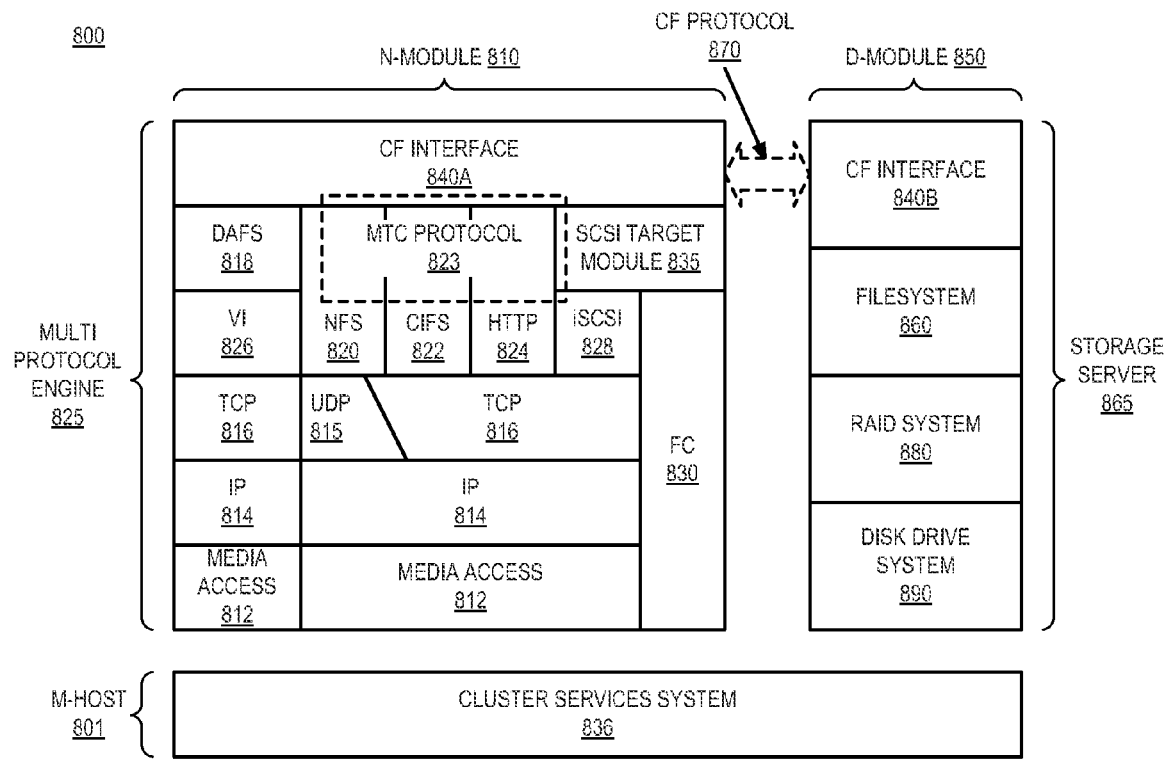
FIG. 8 illustrates an embodiment of the storage operating system of FIG. 7 in which a multi-tiered cache with a virtual storage appliance can be implemented.

FIG. 8 is a block diagram of a storage operating system, such as storage operating system 714 of FIG. 7, which implements an embodiment of a multi-tiered cache with a virtual storage appliance. The storage operating system comprises a series of software layers executed by a processor, such as processor 702 of FIG. 7, and organized to form an integrated network protocol stack or, more generally, a multi-protocol engine 825 that provides data paths for clients to access information stored on the storage server using block and access protocols.

Multi-protocol engine 825 includes a media access layer 812 of network drivers (e.g., gigabit Ethernet drivers) that interface with network protocol layers, such as the IP layer 814 and its supporting transport mechanisms, the TCP layer 816 and the User Datagram Protocol (VIP) layer 815. A file system protocol layer provides multi-protocol file access and, to that end, includes support for the Direct Access File System (DAFS) protocol 818, the NFS protocol 820, the CIFS protocol 822 and the Hypertext Transfer Protocol (HTTP) protocol 824. A VI layer 826 implements the VI architecture to provide direct access transport (DAT) capabilities, such as RDMA, as required by the DAFS protocol 818. An iSCSI driver layer 828 provides block protocol access over the TCP/IP network protocol layers, while a FC driver layer 830 receives and transmits block access requests and responses to and from the storage server. In certain cases, a Fibre Channel over Ethernet (FCoE) layer (not shown) can also be operative in multi-protocol engine 825 to receive and transmit requests and responses to and from the storage server. The FC and iSCSI drivers provide respective FC- and iSCSI-specific access control to the blocks and, thus, manage exports of luns to either iSCSI or FCP or, alternatively, to both iSCSI and FCP when accessing blocks on the storage server.

In one embodiment, multi-protocol engine 825 includes a multi-tiered cache (MTC) protocol 823 used by tiers of a multi-tiered cache to communicate with each other (via their respective controllers). MTC protocol 823 can be exposed as a set of APIs usable with any of a variety of protocols, and is thus shown overlaying various protocols. MTC protocol 823 includes rules or standards that manage when and what a cache tier controller will communicate to another cache tier controller. The communication between tiers affects the operation of the multi-tiered cache, as described above.

The storage operating system also includes a series of software layers organized to form a storage server 865 that provides data paths for accessing information stored on storage devices. Information can include data received from a client, in addition to data accessed by the storage operating system in support of storage server operations such as program application data or other system data. Preferably, client data can be organized as one or more logical storage objects (e.g., volumes) that comprise a collection of storage devices cooperating to define an overall logical arrangement. In one embodiment, the logical arrangement can involve logical volume block number (vbn) spaces, wherein each volume is associated with a unique vbn.

File system 860 implements a virtualization system of the storage operating system through the interaction with one or more virtualization modules (illustrated as a SCSI target module 835), SCSI target module 835 is generally disposed between drivers 828, 830 and file system 860 to provide a translation layer between the block (lun) space and the file system space, where luns are represented as blocks. In one embodiment, file system 860 implements a WAFL (write anywhere file layout) file system having an on-disk format representation that is block-based using, e.g., 4 kilobyte (KB) blocks and using a data structure such as index nodes ("inodes") to identify files and file attributes (such as creation time, access permissions, size and block location). File system 860 uses files to store metadata describing the layout of its file system, including an inode file, which directly or indirectly references (points to) the underlying data blocks of a file.

Operationally, a request from a client is forwarded as a packet over the network and onto the storage server where it is received at a network adapter. A network driver such as layer 812 or layer 830 processes the packet and, if appropriate, passes it on to a network protocol and file access layer for additional processing prior to forwarding to file system 860. There, file system 860 generates operations to load (retrieve) the requested data from the disks if it is not resident "in core", i.e., in memory 710. If the information is not in memory, file system 860 accesses the mode file to retrieve a logical vbn and passes a message structure including the vbn to the RAID system 880. There, the logical vbn is mapped to a disk identifier and device block number (disk, dbn) and sent to an appropriate driver of disk driver system 890. The disk driver accesses the dbn from the specified disk and loads the requested data block(s) in memory for processing by the storage server. Upon completion of the request, the node (and operating system 800) returns a reply to the client over the network.

It should be noted that the software "path" through the storage operating system layers described above needed to perform data storage access for the client request received at the storage server adaptable to the teachings of the invention can alternatively be implemented in hardware. That is, in an alternate embodiment of the invention, a storage access request data path can be implemented as logic circuitry embodied within a field programmable gate array (FPGA) or an application specific integrated circuit (ASIC). This type of hardware embodiment increases the performance of the storage service provided by the storage server in response to a request issued by a client. Moreover, in another alternate embodiment of the invention, the processing elements of adapters 720, 740 can be configured to offload some or all of the packet processing and storage access operations, respectively, from processor 702, to thereby increase the performance of the storage service provided by the storage server. It is expressly contemplated that the various processes, architectures and procedures described herein can be implemented in hardware, firmware or software.

When implemented in a cluster, data access components of the storage operating system can be embodied as D-module 850 for accessing data stored on disk. In contrast, multi-protocol engine 825 can be embodied as N-module 810 to perform protocol termination with respect to a client issuing incoming access over the network, as well as to redirect the access requests to any other N-module in the cluster. A cluster services system 836 can further implement an M-host (e.g., M-host 801) to provide cluster services for generating information sharing operations to present a distributed file system image for the cluster. For instance, media access layer 812 can send and receive information packets between the various cluster services systems of the nodes to synchronize the replicated databases in each of the nodes.

In addition, a cluster fabric (CF) interface module 840 (CF interface modules 840A, 840B) can facilitate intra-cluster communication between N-module 810 and D-module 850 using a CF protocol 870. For instance, D-module 850 can expose a CF application programming interface (API) to which N-module 810 (or another D-module not shown) issues calls. To that end, CF interface module 840 can be organized as a CF encoder/decoder using local procedure calls (LPCs) and remote procedure calls (RPCs) to communicate a file system command to between D-modules residing on the same node and remote nodes, respectively.

As used herein, the term "storage operating system" generally refers to the computer-executable code operable on a computer to perform a storage function that manages data access and can implement data access semantics of a general purpose operating system. The storage operating system can also be implemented as a microkernel, an application program operating over a general-purpose operating system, ovum a general-purpose operating system with configurable functionality, which is configured for storage applications as described herein.

Flow diagrams as illustrated herein provide examples of sequences of various process actions. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various operations or functions are described herein, which can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communications interface to send data via the communications interface. A machine readable medium or computer readable medium can cause a machine to perform the functions or operations described, and includes any mechanism that provides stores and/or transmits) information in a form accessible by a machine (e.g., computing device, electronic system, or other device), such as via recordable/non-recordable storage media (e.g., read only memory (ROM), random access memory (RAM), magnetic disk storage media, optical storage media, flash memory devices, or other storage media) or via transmission media (e.g., optical, digital, electrical, acoustic signals or other propagated signal). A communication interface includes any mechanism that interfaces to any of a hardwired, wireless, optical, or other medium to communicate to another device, such as a memory bus interface, a processor bus interface, an Internet connection, a disk controller. The communication interface can be configured by providing configuration parameters and/or sending signals to prepare the communication interface to provide a data signal describing the software content.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations without departing from their scope. Therefore, the illustrations and examples herein should be construed in an illustrative, and not a restrictive sense.

What is claimed is:

1. A method in a multi-tiered cache comprising:
   detecting, by a first cache device controller for a tier of the multi-tiered cache, a change of a workload characteristic at the tier of the multi-tiered cache, where at least one of the tiers of the multi-tiered cache includes a dynamically resizable cache element, and wherein each tier is managed by a cache device controller; and
   communicating the change of the workload characteristic from the first cache device controller to a second cache device controller of a different tier of the multi-tiered cache to cause the second cache device controller to adjust one or both of a caching size and policy in response to the change;
   wherein a first workload and a second workload overlap access to at least a portion of cached data in the multi-tiered cache, wherein the first workload accesses the portion of cached data through a dynamic cache virtual storage appliance (VSA), and the second workload does not access the portion of cached data through the dynamic cache VSA, and wherein a change in behavior of the second workload causes the dynamic cache VSA to adjust one or both of a caching size and policy for the first workload.

2. The method of claim 1, wherein detecting the change of the workload characteristic comprises detecting one or more of a change in rate of cache miss, ratio of read versus write input/output (I/O) requests, I/O size, or ratio of random to sequential accesses.

3. The method of claim 1, wherein detecting the change of the workload characteristic comprises detecting a change in working set by detecting access to a set of data not already cached.

4. The method of claim 1, wherein detecting the change of the workload characteristic comprises detecting a change in a hierarchically highest tier of cache nearest a client, and further comprising communicating the change to a controller of a cache tier of a backend storage server.

5. The method of claim 1, wherein to adjust the caching size and policy comprises dynamically de-provisioning the dynamic cache VSA.

6. The method of claim 1, wherein to adjust one or both of the caching size and policy comprises dynamically instantiating the dynamic cache VSA as a cache tier to increase at least a portion of a tier of the multi-tiered cache.

7. The method of claim 1, wherein to adjust one or both of the caching size and policy comprises changing a pre-fetch policy indicating an amount of read-ahead to perform, or changing a caching policy indicating how long to keep data.

8. The method of claim 1, wherein to cause the different tier to adjust caching size and policy comprises to adjust one or both of the caching size and policy in response to the change only if the change is more than a preconfigured threshold.

9. The method of claim 1, wherein to adjust one or both of the caching size and policy comprises adjusting a memory allocation size of the dynamically resizable cache element.

10. A storage subsystem comprising:
a storage server having at least one tier of a cache, the at least one tier of the cache including a first tier of the cache;
a dynamic cache virtual storage appliance (VSA) executing in a virtual machine hosted on hardware resources separate from the storage server, the dynamic cache VSA providing a second tier of the cache, the cache comprising a multi-tiered cache, each tier including a controller to manage the cache tier; and
a communication protocol for cache communication between a controller the first tier of cache at the storage server and a controller of the second tier of cache at the dynamic cache VSA,
wherein at least the first tier of cache at the storage server, or the dynamic cache VSA, or both are dynamically resizable, and
wherein the controllers of the first and second tiers of cache are configured to detect a change of a workload characteristic, and to communicate the change of the workload characteristic to the other controller to cause the other controller to adjust one or both of a cache size and policy for its cache tier in response to the change.

11. The storage subsystem of claim 10, wherein at least the controller of the second tier of the cache is configured to detect one or more of a change in rate of cache miss, ratio of read versus write input/output (I/O) requests, I/O size, or ratio of random to sequential accesses.

12. The storage subsystem of claim 10, wherein to adjust one or both of the caching size and policy comprises changing a pre-fetch policy indicating an amount of read-ahead to perform, or changing a caching policy indicating how long to keep data.

13. The storage subsystem of claim 10, wherein the controllers of the first and second tiers of the cache are configured to detect the change in the workload characteristic only if the change is greater than a threshold.

14. The storage subsystem of claim 10, wherein the storage server is configured to adjust one or both of the caching size and policy by de-provisioning a virtual storage appliance acting as a tier of dynamic cache to remove at least a portion of a tier of the multi-tiered cache, or by dynamically instantiating a virtual storage appliance as a tier of dynamic cache to increase at least a portion of a tier of the multi-tiered cache.

15. The storage subsystem of claim 10, wherein the controllers of the first and second tiers of the cache are further configured to receive a communication from a controller of a different tier of the multi-tiered cache indicating detection by the controller of the different tier of a change of workload characteristics at the different tier, determine from the communication to alter behavior of the multi-tiered cache in response to the change of workload characteristics at the different tier, and adjust how caching is performed in the multi-tiered cache in response to the change of workload characteristics at the different tier, including adjusting a memory allocation size of a dynamically resizable cache element.

16. The storage subsystem of claim 10, wherein the controllers of the first and second tiers of the cache are configured to adjust one or both of the caching size and policy by adjusting a memory allocation size of a dynamically resizable cache element.

17. An article of manufacture comprising a non-transitory computer-readable storage medium having content stored thereon, which when accessed by a computing device causes the computing device to perform operations including:
detecting, by a first cache controller for a first tier of a multi-tiered cache, a change of a workload characteristic at the first tier of the multi-tiered cache, where at least one of the tiers of the multi-tiered cache includes a dynamically resizable cache element; and
communicating the change of the workload characteristic from the first cache controller to a second cache controller of a second tier of the multi-tiered cache to cause the second cache controller to adjust one or both of a caching size and policy in response to the change, including adjusting a memory allocation size of the dynamically resizable cache element;
wherein a first workload and a second workload overlap access to at least a portion of cached data in the multi-tiered cache, wherein the first workload accesses the portion of cached data through a dynamic cache virtual storage appliance (VSA), and the second workload does not access the portion of cached data through the dynamic cache VSA, and wherein a change in behavior of the second workload causes the dynamic cache VSA to adjust one or both of a caching size and policy for the first workload.

18. The article of manufacture of claim 17, wherein detecting the change of the workload characteristic comprises detecting one or more of a change in rate of cache miss, ratio of read versus write input/output (I/O) requests, I/O size, or ratio of random to sequential accesses.

19. The article of manufacture of claim 17, wherein to adjust one or both of the caching size and policy comprises changing a pre-fetch policy indicating an amount of read-ahead to perform, or changing a caching policy indicating how long to keep data.

20. The article of manufacture of claim 17, wherein to cause the second cache controller of the second tier to adjust one or both of the caching size and policy comprises to adjust one or both of the caching size and policy in response to the change only if the change is more than a preconfigured threshold.

21. The article of manufacture of claim 17, wherein to adjust one or both of the caching size and policy comprises adjusting the caching size and policy by de-provisioning the dynamic cache VSA to remove at least a portion of a tier of the multi-tiered cache, or by dynamically instantiating the dynamic cache VSA as a tier of dynamic cache to increase at least a portion of a tier of the multi-tiered cache.

22. The article of manufacture of claim 17, wherein to adjust one or both of the caching size and policy comprises adjusting a memory allocation size of the dynamically resizable cache element.

* * * * *